March 1, 1938.  H. W. BATCHELLER  2,109,790
TELLTALE ELECTRIC SWITCH
Filed July 18, 1935
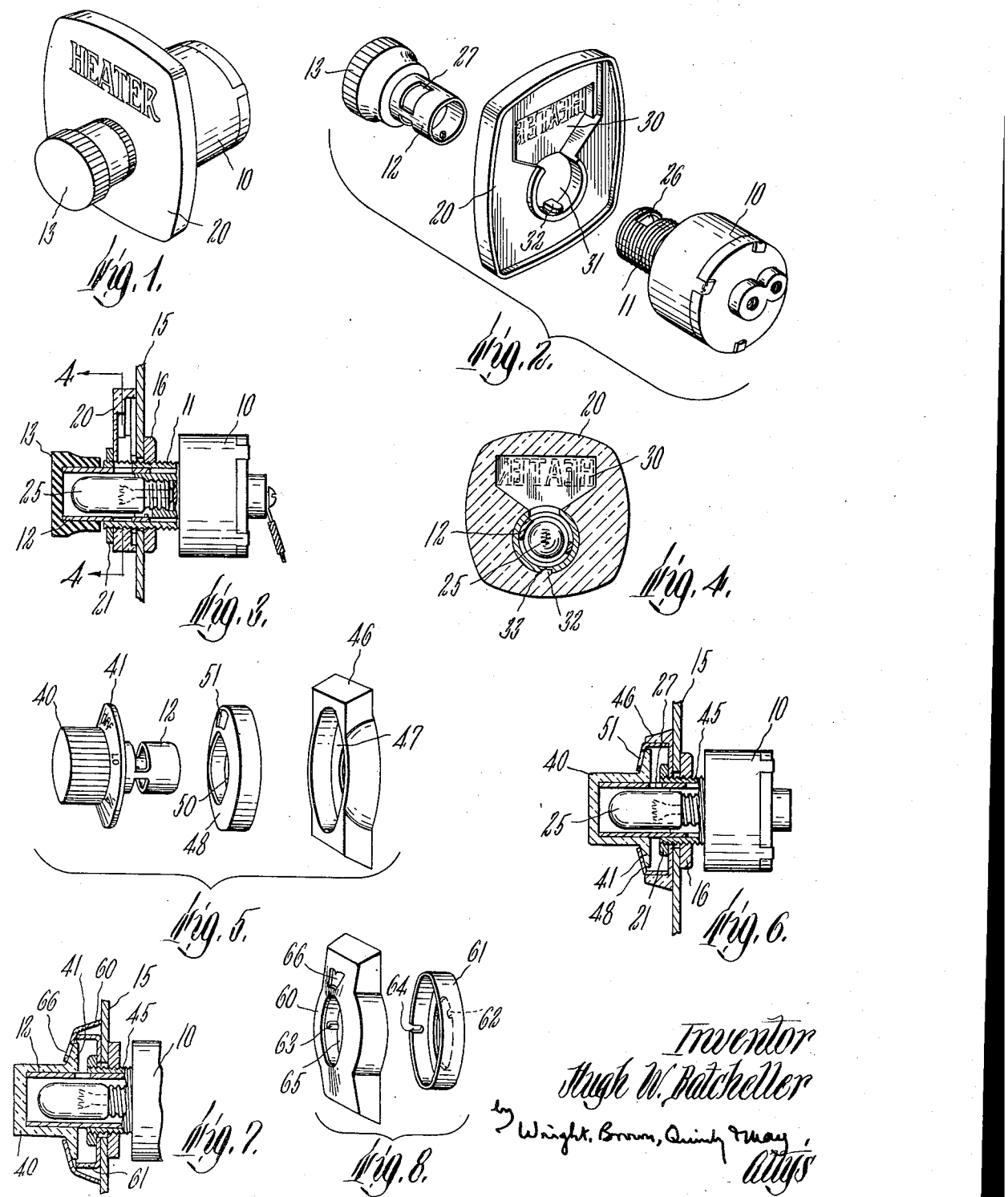

Patented Mar. 1, 1938

2,109,790

UNITED STATES PATENT OFFICE 2,109,790

TELLTALE ELECTRIC SWITCH

Hugh W. Batcheller, Waltham, Mass., assignor to Standard Mfg. Co., Worcester, Mass., a corporation of Massachusetts Application July 18, 1935, Serial No. 32,031

4 Claims. (Cl. 200—167)

This invention relates to improvements in electric switches and rheostats, particularly such as are adapted to be mounted on the dash of an automobile for controlling auxiliary electrical apparatus in the automobile. A telltale light is desirable for such apparaus to diminish the chances of inadvertently leaving the apparatus connected to the battery for extended periods of time, and the consequent danger of exhausting and damaging the battery. Dashboard switches and rheostats for automobiles are in wide use, many such devices including an externally threaded sleeve carrying a pair of nuts by which the device can be clamped to the dash directly or to a bracket which in turn may be secured to the dash.

It is an object of the present invention to provide a translucent member which can be supplied as a part of a switch or rheostat structure or can be mounted on a pre-existing switch or rheostat. According to the invention, an aperture is provided in the sleeve whereby light from a lamp therein may shine out radially to illuminate the translucent member from the rear, such member being offset radially from the sleeve. The invention may be embodied in various ways, some of which are hereinafter described in detail and are illustrated on the drawing of which Figure 1 is a perspective view of an embodiment of the invention.

Figure 2 is a perspective view of separated portions of the device shown in Figure 1.

Figure 3 is a sectional view of the device shown in Figure 1.

Figure 4 is a sectional view on the line 4—4 of Figure 3.

Figure 5 is a perspective view of a modified form of the invention.

Figure 6 is a sectional view of the members shown in Figure 5, mounted on a switch.

Figure 7 is a sectional view of a further modified form of the invention.

Figure 8 is a perspective view of two of the members illustrated in Figure 7.

Figures 1 to 4 illustrate one form of the invention as applied to a switch or rheostat of the type adapted to be mounted on the dash of an automobile. The switch or rheostat itself is enclosed in a housing 10, this housing including a forwardly projecting sleeve 11 which is preferably screw-threaded as shown. Rotatably mounted within the sleeve 11 is a hollow shaft 12 which is operably connected to the switch or rheostat so that the latter is turned on or off by rotation of the shaft 12. A suitable finger knob 13 is mounted on the outer end of the shaft to facilitate rotation of the shaft. The details of structure of the switch or rheostat contained in the housing 10 are not shown in the drawing as these details may be in any desired forms such as illustrated in my copending application Ser. No. 689,585, filed September 15, 1933. In attaching a switch of this kind to the dash of an automobile, a hole may be formed in the dash to receive the sleeve 11, a nut being set up on the sleeve against each of the opposite faces of the dash member so as to hold the switch firmly in place. According to the present invention, a translucent member is mounted on the sleeve in front of the dash, this member being adapted to be illuminated from behind so that light shines through a translucent portion thereof when the switch or rheostat is "on". As shown in Figure 3, the member indicated by the reference character 15 may represent a portion of the dash itself or a bracket which may in turn be clamped to the dash without necessitating a hole through the dash. The rear face of the member 15 is engaged by a nut 16 on the sleeve 11. Against the front face of the member 15 a shield 20 is clamped as by a nut 21 which is threaded on the sleeve 11. Illumination is provided by a suitable lamp 25 mounted within the hollow shaft 12 connectible so as to be lighted when the switch or rheostat is "on" and to be unlighted when the switch or rheostat is "off". In order that rays of light from the lamp 25 may reach the rear face of the shield 20, I may provide a lateral aperture 26 in the sleeve 11 adapted to register with one or more apertures 27 in the hollow shaft 12. As indicated in Figure 2, a portion 30 of the shield 20 is made with a comparatively thin wall so as to transmit more light than the remaining thicker portion of the shield. This thinner portion may, if desired, carry a legend, the manufacturer's name, or any other similar matter. The shield 20 is also made with a circular aperture 31 adapted to fit loosely on the sleeve 11 so that the shield surrounds the sleeve and projects radially therefrom. When the shield 20 is placed on the sleeve 11 in assembling the device, the thin portion 30 should be immediately above and in front of the aperture 26. To ensure correct angular relation between the shield and sleeve, a key 32 may be provided in the aperture 31 to enter a longitudinal slot 33 in the sleeve 11. When the device is properly mounted on the dash of an automobile, the aperture 26 is uppermost in the sleeve 11 and is immediately behind the thin portion 30 of the shield. When the lamp 25 lights, rays of light from the lamp pass through the windows 27 and 26 and illuminate the thin portion 30 of the shield from the rear. Since the light rays which pass through the aperture 26 are either radial or nearly so, the rays which illuminate the shield impinge at small angles on the rear face of the thin portion 30, thus subduing the transmitted light.

Figures 5 and 6 show a modified form of the invention. As shown in Figure 5, the hollow shaft 12 is provided with a knob 40 which has a radial flange 41 of translucent material. The switch housing 10 is provided with a relatively short sleeve 45 adapted to project through the member 15, and with a casing member 46 which may be of any desired material. This casing member may conveniently be made of a molded translucent plastic material similar to the material used for the knob 40 and its flange 41. The casing member 46 is clamped against the member 15 by nuts 16 and 21 threaded on the sleeve 45, and has a large circular opening 47 adapted to receive a disk-like member 48. The member 48 has a central opening 50 through which the knob 40 projects, and also a small window 51 adapted to expose a portion of the translucent flange 41. The shaft 12 is provided, as before, with one or more apertures 27 through which rays of light from the lamp 25 may shine. As shown in Figure 6, the sleeve 45 may be sufficiently short to obviate the necessity of any apertures 26, the apertures 27 in the shaft 12 being beyond the end of the sleeve 45. The members 46 and 48, together with the flange 41, form an enclosure into which some of the light from the lamp 25 shines when the lamp is lighted. The member 48 is preferably of sheet metal or other opaque material, so that, while the entire rear face of the flange 41 is more or less illuminated through the apertures 27, the only visible portion of the flange 41 is that which is seen through the window 51. If desired, appropriate legends may be imprinted on the flange 41, as indicated in Figure 5, so as to appear in the window 51 and indicate conditions of the rheostat when the shaft is turned to corresponding angular positions.

Figures 7 and 8 illustrate a further modified form of the invention. In this form, the enclosure surrounding the shaft 12 is formed by a pair of casing members 60 and 61, these members being of any suitable material such as metal stampings. The member 61 is a flanged disk having a central opening adapted to fit loosely on the sleeve 45, a key element 62 being provided to engage in a corresponding slot in the sleeve to hold the member 61 in a correct angular position on the sleeve. The proper angular position between the members 60 and 61 may be ensured by a key element 63 on the member 60 which engages in a notch 64 on the member 61. The member 60 is provided with a central aperture 65 through which the knob 40 is adapted to project. The member 60 is also provided with a window 66 through which a portion of the flange 41 of the knob can show. The member 60, being preferably opaque, exposes for the transmission of light only the portion of the flange 41 that appears in the window 66.

It is evident that various modifications and changes may be made in the embodiments of the invention herein shown and described without departing from the spirit or scope of the invention as defined in the following claims.

I claim:—

1. A device of the class described, comprising a housing, an electric switch mounted in said housing, a hollow operating shaft projecting forwardly from said housing and manually rotatable between two extreme angular positions to operate said switch, a telltale lamp mounted within said shaft and electrically connected to said switch so as to be lighted when said shaft is in one extreme position and to be unlighted when the shaft is in its other extreme position, a lateral aperture in said shaft for the transmission radially therethrough of light from said lamp when lighted, and a translucent member having a rear surface in a plane perpendicular to the axis of said shaft and located immediately forward of said aperture whereby said translucent member is dimly illuminated by rays of light shining through said aperture and impinging on the rear face thereof at a small angle.

2. In a device of the class described, a housing including a forwardly-projecting fixed sleeve, a hollow shaft rotatable in said sleeve, an operating knob on the forward end of said shaft, current-controlling means in said housing actuated by rotation of said shaft, a telltale light bulb mounted in said sleeve and electrically connected to said current-controlling means, said sleeve and shaft having lateral apertures arranged to be in registry when said current-controlling means are in a position to permit current to flow therethrough, and a shield surrounding said shaft and radial with respect to the axis thereof, said shield having a radially extending translucent portion immediately forward of said apertures whereby said translucent portion is illuminated from the rear by nearly radial rays impinging on the rear of said shield at a small angle when said telltale bulb is lighted.

3. A device of the class described, comprising a housing including a forwardly projecting sleeve, an electric switch within said housing, a hollow shaft rotatably mounted in said sleeve and operably connected to said switch, a telltale lamp mounted in said shaft and connectible to be lighted when the switch is "on" and to be unlighted when the switch is "off", said sleeve and shaft having lateral apertures registering with each other when the lamp is lighted, and a shield mounted on said sleeve near the forward end thereof, said shield having a translucent portion forward of said apertures whereby said portion is illuminated from the rear by light rays impinging on the rear face of said shield at a small angle when said lamp is lighted.

4. A device of the class described, comprising a housing including a forwardly-projecting sleeve, an electric switch within said housing, a hollow shaft rotatably mounted in said sleeve and operably connected to said switch, a telltale lamp mounted in said shaft and connectible to be lighted when the switch is "on" and to be unlighted when the switch is "off", an operating knob on the forward end portion of said shaft, said knob having a translucent flange extending radially, said shaft having a lateral aperture behind said flange to permit light from said lamp to illuminate the rear face of said flange, and a substantially opaque screen supported by said sleeve in front of said flange, said screen having an aperture therein to expose a portion of the flange.

HUGH W. BATCHELLER.